United States Patent [19]
Tahara et al.

[11] Patent Number: 5,489,645
[45] Date of Patent: Feb. 6, 1996

[54] PROCESS FOR PRODUCING WATER-BASE RESIN DISPERSION

[75] Inventors: Seuchiro Tahara; Tomio Hashimoto; Takako Kanayama, all of Tokyo, Japan

[73] Assignee: Toyo Ink Manufacturing Co., Ltd., Tokyo, Japan

[21] Appl. No.: 246,498

[22] Filed: May 20, 1994

Related U.S. Application Data

[63] Continuation-in-part of Ser. No. 985,213, Dec. 3, 1992, abandoned.

[30] Foreign Application Priority Data

| Dec. 6, 1991 | [JP] | Japan | 3-348996 |
| Sep. 4, 1992 | [JP] | Japan | 3-263004 |

[51] Int. Cl.⁶ ................................................. C08F 28/02
[52] U.S. Cl. ........................... 524/817; 524/807; 524/814; 524/458; 524/460
[58] Field of Search ................................ 524/817, 458, 524/460, 814, 867

[56] References Cited

U.S. PATENT DOCUMENTS

| 3,740,366 | 6/1973 | Sanderson et al. | 524/398 |
| 4,337,185 | 6/1982 | Wessling et al. | 524/458 |
| 4,617,343 | 10/1986 | Walker et al. | 524/817 |

*Primary Examiner*—Jeffrey T. Smith
*Attorney, Agent, or Firm*—Wenderoth, Lind & Ponack

[57] ABSTRACT

A process for producing a water-base resin dispersion which contains resin particles having a very fine particle diameter as fine as 25 to 100 nm and gives a coating composition excellent in water resistance, alkali resistance and resistance to whitening in hot water, the process being very stable in emulsification and comprising dropwise adding a mixture containing 30 to 100% by weight of said radical-polymerizable ethylenically unsaturated monomer and 20 to 90% by weight of said reactive emulsifier and water to a reactor containing 0 to 70% by weight of said radical-polymerizable ethylenically unsaturated monomer and 10 to 80% by weight of said reactive emulsifier and radical-polymerizing the radical-polymerizable ethylenically unsaturated monomer in the presence of an organic polymerization initiator.

8 Claims, No Drawings

PROCESS FOR PRODUCING WATER-BASE RESIN DISPERSION

This application is a continuation-in-part of now abandoned application, Ser. No. 07/985,213, filed Dec. 3, 1992, now abandoned.

FIELD OF THE INVENTION

The present invention relates to a process for producing a water-base resin dispersion, and more specifically to a process for producing a water-base resin dispersion which contains dispersed particles having a very fine particle diameter and is excellent in water resistance.

PRIOR ART

In recent years, coating-compositions of an organic solvent type are being gradually changed to water-base coating compositions, particularly to water-base emulsion type coating compositions, from the viewpoints of air pollution, environmental improvement in working sites, effective use of resources and safety against fire.

However, as compared with a coating formed by applying a coating composition of an organic solvent type, coating formed by applying a general water-base emulsion coating composition and drying it is poor in denseness and consequently poor in water resistance in particular.

In the field of buildings, it is desired to develop a water-base emulsion coating composition which retains weatherability for a long period of time and is excellent in resistance to (hot) water-induced whitening and alkali resistance for maintaining an initial aesthetically fine appearance. When conventional coating compositions are used, coatings are sometimes whitened due to rain and deteriorated due to alkaline base materials such as concrete, mortar and slates, and the aesthetically fine appearance is sometimes impaired.

For overcoming the above defect, there is known a method for producing a water-base emulsion containing no emulsifier or a very small amount of an emulsifier. In this method, however, the emulsion is unstable when produced and a resin is liable to aggregate or extremely contaminate a reaction vessel. Further, even if the emulsion is stably produced, it has too poor miscibility to a pigment, etc., to form a coating composition.

For improving the denseness of a coating, there is known a method in which the particle size of a resin is decreased. However, the method for decreasing the resin particle size involves various problems. For example, when a large amount of an emulsifier is used for producing an emulsion, the emulsifier decreases the coating performance and extraordinarily deteriorates the water resistance of a coating. There is known a method of obtaining a water-base dispersion of a fine-particle resin, in which resin particles are swollen by neutralizing a water-base dispersion obtained by copolymerizing unsaturated carboxylic acid such as acrylic acid or methacrylic acid or by adding an organic solvent to the water-base dispersion, and the resin particles are further finely divided under mechanical shear. However, the resin particles are not uniformly finely divided, and coarse particles remain. Therefore, a coating composition giving an excellent coating and a coating having excellent water resistance are not always obtained.

JP-A-62-283166 discloses a method in which a water-base fine-particle resin dispersion can be obtained by using a combination of a reactive emulsifier with an inorganic redox catalyst. In this method, however, the stability of emulsification for obtaining a water-base resin dispersion is not improved, and the solid content in the water-base resin dispersion is limited to not more than about 30% by weight.

SUMMARY OF THE INVENTION

It is an object of the present invention to provide a process for producing a water-base resin dispersion which gives a coating composition having excellent water resistance.

It is another object of the present invention to provide a process for producing a water-base dispersion, in which the emulsification for producing the water-base resin dispersion is stable.

It is further another object of the present invention to provide a process for producing a water-base resin dispersion containing fine resin particles.

It is still further another object of the present invention to provide a process for producing a water-base resin dispersion, which can give a coating excellent in resistance to whitening in (hot) water and alkali resistance.

According to the present invention, there is provided a process for producing a water-base resin dispersion having an average resin particle diameter of 25 to 100 nm by emulsion polymerization of a radical-polymerizable ethylenically unsaturated monomer in the presence of a reactive emulsifier in an amount of 2 to 10 parts by weight per 100 parts by weight of the radical-polymerizable ethylenically unsaturated monomer, the process comprising dropwise adding a mixture containing 30 to 100% by weight of said radical-polymerizable ethylenically unsaturated monomer and 20 to 90% by weight of said reactive emulsifier and water to a reactor containing 0 to 70% by weight of said radical-polymerizable ethylenically unsaturated monomer and 10 to 80% by weight of said reactive emulsifier and radical-polymerizing the radical-polymerizable ethylenically unsaturated monomer in the presence of an organic polymerization initiator, wherein:
the radical-polymerizable ethylenically unsaturated monomer is at least one monomer selected from the group consisting of alkyl acrylates, alkyl methacrylates, styrene-containing monomers, vinyl carboxylates, acrylonitrile and methacrylonitrile, and the reactive emulsifier is at least one emulsifier selected from the group consisting of sulfosuccinic acid ester type emulsifiers of the following formulae (1) and (2) and alkylphenol ether type emulsifiers of the following formula (3),

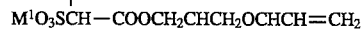

wherein $R^1$ is an alkyl group having 12 to 30 carbon atoms, and $M^1$ is Na, NH$_4$ or K,

where in $R^1$ and $M^1$ are as defined in the formula (1),

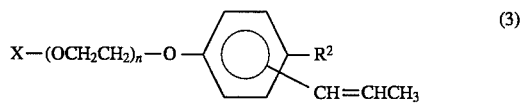

wherein $R^2$ is an alkyl group having 8 to 12 carbon atoms, X is H or $SO_3M_2$ in which $M_2$ is Na, $NH_4$ or K, and n is a number of from 1 to 200.

DETAILED DESCRIPTION OF THE INVENTION

The radical-polymerizable ethylenically unsaturated monomer used in the present invention includes (meth-)acrylic acid alkyl esters including acrylate esters such as methyl acrylate, ethyl acrylate, butyl acrylate and 2-ethylhexyl acrylate and methacrylate esters such as methyl methacrylate, ethyl methacrylate, butyl methacrylate and 2-ethylhexyl methacrylate, styrene, styrene-containing monomers such as α-methylstyrene and vinyltoluene, carboxylic acid vinyl esters such as vinyl acetate, vinyl propionate and vinyl versatate, acrylonitrile and methacrylonitrile.

Further, a carboxylic acid monomer may be used in combination to improve the stability of the water-base resin dispersion when it is produced or stored. The carboxylic acid monomer includes acrylic acid, methacrylic acid, maleic acid, fumaric acid, itaconic acid, p-vinylbenzoic acid and p-vinylbenzenesulfonic acid. The amount of the carboxylic acid monomer is 0.05 to 10% by weight based on the total monomer amount.

For adjusting the fluidity and dryability of a coating composition, there may be used any one of radical-polymerizable ethylenically unsaturated monomers such as acrylamide, methacrylamide, N-methylolacrylamide, hydroxyethyl acrylate, hydroxypropyl methacrylate, hydroxypropyl acrylate, hydroxymethacrylate, hydroxyethyl methacrylate, glycidyl methacrylate and glycidyl acrylate. The amount of the monomer(s) is 0.05 to 30% by weight based on the total amount of the monomers. For imparting a coating with a crosslinked structure, there may be used any one of ethylene glycol dimethacrylate, divinylbenzene, vinyltriethoxysilane, γ-methacryloxypropyltriethoxysilane, The amount of the above monomer(s) is 0.05 to 30% by weight based on the total amount of the monomers.

The reactive emulsifier used in the present invention has at least one radical-polymerizable unsaturated group in the molecule. The reactive emulsifier includes sulfosuccinic acid ester type emulsifiers of the following formulae (1) and (2) (e.g., commercially available products such as Latemul S-120 and S-180PS-180A, supplied by Kao Corp., and Eleminol JS-2, supplied by Sanyo Chemical Industries, Ltd.) and alkylphenol ether type emulsifiers of the following formula (3) (e.g., Aquaron HS-10 and RN-20, supplied by Daiichi Kogyo Seiyaku Co., Ltd.)

wherein $R^1$ is an alkyl group having 12 to 30 carbon atoms, and $M^1$ is Na, $NH_4$ or K.

wherein $R^1$ and $M^1$ are as defined in the formula (1).

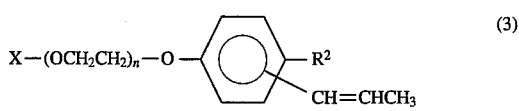

wherein $R^2$ is an alkyl group having 8 to 12 carbon atoms, X is H or $SO_3M_2$ in which $M_2$ is Na, $NH_4$ or K, and n is a number of from 1 to 200.

The above reactive emulsifiers may be used alone or in combination. Further, a non-reactive emulsifier may be used in combination as required.

The amount of the reactive emulsifier for use per 100 parts by weight of the ethylenically unsaturated monomer is 2 to 10 parts by weight. When this amount is less than the lower limit, the resin particles in the resultant water-base resin dispersion have large particle diameters. When this amount exceeds the above upper limit, a coating shows deteriorated water resistance, although the resin particles have small diameters.

The reactive surfactant of the above formula (3) has a propenyl group in the hydrophobic portion thereof, so that it is excellent in the copolymerizability with ethylenically unsaturated monomers. This is assumed to be a reason for further improving the coating in alkali resistance.

The present invention has one of its characteristic features in that 10 to 80% by weight, preferably 20 to 70% by weight of the reactive emulsifier is preliminarily placed in a reactor when the radical polymerization is initiated. That is, part of the reactive emulsifier and a predetermined amount of water are placed in a reactor, and then the monomer is added dropwise to carry out the radical polymerization. In this case, the ethylenically unsaturated monomer in an amount not exceeding 70% by weight may be present in the reactor. When the amount of the reactive emulsifier preliminarily placed in the reactor is less than 10% by weight, undesirably, the resin particles have large diameters. When this amount exceeds 80% by weight, the polymerization system is unstable due to smallness of the amount of the emulsifier used in a later polymerization step.

Another characteristic feature of the present invention is that an organic polymerization initiator is used as a radical polymerization initiator. The organic polymerization initiator includes organic peroxides such as tert-butyl perbenzoate, dilauryl peroxide, benzoyl peroxide and tert-butyl hydroperoxide. These organic polymerization initiators may be used alone, while the organic polymerization initiator may be used as a redox type initiator, a combination thereof with a reducing agent such as sodium erythrobate. It is not preferred to use inorganic peroxides such as ammonium peroxide and sodium peroxide, since the resin particles grow too large in the polymerization step.

The amount of the organic polymerization initiator per 100 parts by weight of the monomer is 0.5 to 10 parts by weight. Part (10 to 50% by weight) of the organic polymerization initiator is preliminarily placed in the reactor, and a balance of the organic polymerization initiator is added as a mixture thereof with the monomer and the reactive emulsifier.

When a mixture containing part of the ethylenically unsaturated monomer, part of the emulsifier and water is added dropwise, preferably, the mixture is added as an emulsion composed of 100 parts by weight of the ethylenically unsaturated monomer, 50 to 200 parts by weight of water and a balance of the reactive emulsifier.

The radical polymerization is carried out at a temperature between 50° C. and 90° C. for 1 to 5 hours, during which the above mixture is added dropwise continuously or intermittently.

In the present invention, the reactor may contain transition metal ion, e.g., copper ion from cupric sulfate or cupric chloride or ferric ion from ferric sulfate or ferric chloride. The amount of this transition metal ion is $10^{-7}$ to $10^{-5}$ mol per liter or the water placed in the reactor.

When the above transition metal ion is added, the water-base resin dispersion produced has a decreased particle diameter. With a decrease in the particle diameter, the denseness of the coating is further improved, so that the coating is improved in resistance to whitening in (hot) water and alkali resistance.

In the radical polymerization of the present invention, a buffer, a protective colloid and a chain transfer agent may be used. The buffer includes sodium acetate, sodium citrate and bicarbonate. The protective colloid includes polyvinyl alcohol and water-soluble cellulose derivative. The chain transfer agent includes mercaptanes such as stearylmercaptane and t-dodecylmercapatne.

The water-base resin dispersion provided by the present invention is obtained as a dispersion containing resin particles having an average particle diameter of 25 to 100 nm, preferably 35 to 80 nm. In the process of the present invention, the water-base resin dispersion is obtained as a dispersion having a solid content of 20 to 60% by weight. Even when the above average particle diameter is less than 25 nm, a coating shows good water resistance. However, the viscosity of the water-base resin dispersion unpractically increases, and the sol id content therefore cannot be increased.

The water-base resin dispersion provided by the process of the present invention may contain colorants such as a dye and a colorant, fillers and the like, and can be used as a coating composition for a resin, leather, a metal, wood, ceramics, mortar, concrete, a calcium silicate plate, etc., a binder for a coating composition, a paper processing agent, a fiber treating agent, and the like.

The process for producing the water-base resin dispersion, provided the by present invention, has its technical feature in that part of the reactive emulsifier is preliminarily placed in a reactor and that the organic polymerization initiator is used. Therefore, the dispersion stability of resin particles is excellent, and the resin particles are free from aggregating to form coarse particles or adhering to a reactor. Further, there can be obtained a water-base resin dispersion containing resin particles having an average particle diameter of 25 to 100 nm. Therefore, the water-base resin dispersion can be obtained as a dispersion having a high solid content. In the polymerization for forming the water-base resin dispersion, the polymerization can be carried out very stably, and it is therefore not necessary to impose any special limitation on the kind of monomers to be used.

The water-base resin dispersion provided by the present invention can give a coating having excellent water resistance.

The present invention will be described further in detail hereinafter by reference to Examples. In Examples, "part" stands for "part by weight, and "%" stands for "% by weight".

EXAMPLE 1

A reactor having a stirrer, a thermometer, a dropping funnel and a refluxer was charged with monomers and a reactive emulsifier shown in Table 1 in amounts shown in the column of "Reactor" in Table 1, and saturated with a nitrogen gas. Separately, a mixture containing components shown in Table 1 in amounts shown in the column of "Addition" in Table 1 had been prepared. The temperature inside the reactor was increased to 65° C., and then polymerization initiators shown in Table 1 in amounts shown in Table 1 were added. After 5 minutes, the addition of the above mixture was initiated, and finished in 3 hours. The reaction mixture was aged at 80° C. for 2 hours, cooled and adjusted to pH of 7–8 to give a water-base resin dispersion having a solid content of 31.0%, a viscosity of 210 cps and containing resin particles having an average particle diameter of 53 nm.

TABLE 1

| Raw materials | Total amount (part) | Reactor | Addition |
|---|---|---|---|
| Ethylenically unsaturated monomers | | | |
| Methyl methacrylate | 170 | 0 | 170 |
| Butyl acrylate | 120 | 0 | 120 |
| Acrylic acid | 10 | 0 | 10 |
| Reactive emulsifier Latemul S-180 | 30 (5%)* | 15 | 15 |
| Polymerization initiators | | | |
| tert-Butyl benzoate | 3 | 0.5 | 2.5 |
| Sodium Erythorbate | 1 | 0.2 | 0.8 |
| Ion-exchanged water | 666 | 384.3 | 281.7 |

*Parenthesized value shows a proportion (of an effective ingredient) based on the total mount of the monomers.
Latemul S-180 = reactive emulsifier (effective ingredient 50%) supplied by Kao Corp.)

EXAMPLES 2–6

Water-base resin dispersions were prepared from ethylenically unsaturated monomers, a reactive emulsifier and polymerization initiators shown in Table 2 (Example 2) to Table 6 (Example 6) in the same manner as in Example 1.

TABLE 2

(Example 2)

| Raw materials | Total amount (part) | Reactor | Addition |
|---|---|---|---|
| Ethylenically unsaturated monomers | | | |
| Methyl methacrylate | 90 | 27 | 63 |
| Ethyl acrylate | — | — | — |
| Butyl acrylate | — | — | — |
| 2-Ethylhexyl acrylate | 162 | 48 | 114 |
| Styrene | 45 | 13 | 32 |
| Acrylic acid | 2 | 0.6 | 1.4 |
| Methacrylic acid | — | — | — |
| Hydroxyethyl methacrylate | 1 | 0.3 | 0.7 |
| Acrylamide | — | — | — |
| Reactive emulsifier Latemul S-180 | 18 (3%) | 7.2 | 10.8 |
| Polymerization initiators | | | |
| tert-Butyl benzoate | 3 | 0.5 | 2.5 |
| Sodium Erythorbate | 1 | 0.2 | 0.8 |
| Ion-exchanged water | 678 | 384.3 | 293.7 |

Latemul S-180 = reactive emulsifier (effective ingredient 50%) supplied by Kao Corp.

TABLE 3

(Example 3)

| Raw materials | Total amount (part) | Reactor | Addition |
|---|---|---|---|
| Ethylenically unsaturated monomers | | | |
| Methyl methacrylate | 150 | 75 | 75 |

TABLE 3-continued (Example 3)

| Raw materials | Total amount (part) | Reactor | Addition |
|---|---|---|---|
| Ethyl acrylate | 145 | 72.5 | 72.5 |
| Butyl acrylate | — | — | — |
| 2-Ethylhexyl acrylate | — | — | — |
| Styrene | — | — | — |
| Acrylic acid | — | — | — |
| Methacrylic acid | 5 | 2.5 | 2.5 |
| Hydroxyethyl methacrylate | — | — | — |
| Acrylamide | — | — | — |
| Reactive emulsifier Eleminol JS-2 | 63 (8%) | 37.8 | 25.2 |
| Polymerization initiators | | | |
| tert-Butyl benzoate | 3 | 0.5 | 2.5 |
| Sodium Erythorbate | 1 | 0.2 | 0.8 |
| Ion-exchanged water | 633 | 384.3 | 248.7 |

Eleminol JS-2 = reactive emulsifier (effective ingredient 38%) supplied by Sanyo Chemical Ind., Ltd.

TABLE 4

(Example 4)

| Raw materials | Total amount (part) | Reactor | Addition |
|---|---|---|---|
| Ethylenically unsaturated monomers | | | |
| Methyl methacrylate | 170 | 34 | 136 |
| Ethyl acrylate | — | — | — |
| Butyl acrylate | 120 | 24 | 96 |
| 2-Ethylhexyl acrylate | — | — | — |
| Styrene | — | — | — |
| Acrylic acid | 8 | 1.6 | 6.4 |
| Methacrylic acid | — | — | — |
| Hydroxyethyl methacrylate | — | — | — |
| Acrylamide | 2 | — | 2 |
| Reactive emulsifier Aquaron HS-10 | 15 (5%) | 4.5 | 10.5 |
| Polymerization initiators | | | |
| tert-Butyl benzoate | 3 | 0.5 | 2.5 |
| Sodium Erythorbate | 1 | 0.2 | 0.8 |
| Ion-exchanged water | 681 | 384.3 | 296.7 |

Aquaron S-10 = reactive emulsifier (effective ingredient 98%) supplied by Daiichi Kogyo Seiyaku

TABLE 5

(Example 5)

| Raw materials | Total amount (part) | Reactor | Addition |
|---|---|---|---|
| Ethylenically unsaturated monomers | | | |
| Methyl methacrylate | 170 | 17 | 153 |
| Ethyl acrylate | — | — | — |
| Butyl acrylate | 120 | 12 | 108 |
| 2-Ethylhexyl acrylate | — | — | — |
| Styrene | — | — | — |
| Acrylic acid | 10 | 1 | 9 |
| Methacrylic acid | — | — | — |
| Hydroxyethyl methacrylate | — | — | — |
| Acrylamide | — | — | — |
| Reactive emulsifier | 30 (5%) | 6 | 24 |

TABLE 5-continued (Example 5)

| Raw materials | Total amount (part) | Reactor | Addition |
|---|---|---|---|
| Latemul S-180 | | | |
| Polymerization initiators | | | |
| tert-Butyl benzoate | 3 | 0.5 | 2.5 |
| Sodium Erythorbate | 1 | 0.2 | 0.8 |
| Ion-exchanged water | 666 | 384.3 | 281.7 |

Latemul S-180 = reactive emulsifier (effective ingredient 50%) supplied by Kao Corp.

TABLE 6

(Example 6)

| Raw materials | Total amount (part) | Reactor | Addition |
|---|---|---|---|
| Ethylenically unsaturated monomers | | | |
| Methyl methacrylate | 170 | 85 | 85 |
| Ethyl acrylate | — | — | — |
| Butyl acrylate | 120 | 60 | 60 |
| 2-Ethylhexyl acrylate | — | — | — |
| Styrene | — | — | — |
| Acrylic acid | 10 | 3 | 7 |
| Methacrylic acid | — | — | — |
| Hydroxyethyl methacrylate | — | — | — |
| Acrylamide | — | — | — |
| Reactive emulsifier Latemul S-180 | 30 (5%) | 21 | 9 |
| Polymerization initiators | | | |
| tert-Butyl benzoate | 3 | 0.5 | 2.5 |
| Sodium Erythorbate | 1 | 0.2 | 0.8 |
| Ion-exchanged water | 666 | 384.3 | 281.7 |

Latemul S-180 = reactive emulsifier (effective ingredient 50%) supplied by Kao Corp.

EXAMPLES 7–10

Water-base resin dispersions were prepared from ethylenically unsaturated monomers, a reactive emulsifier and polymerization initiators shown in Table 7 (Example 7) to Table 10 (Example 10) in the same manner as in Example 1.

TABLE 7

(Example 7)

| Raw materials | Total amount (part) | Reactor | Addition |
|---|---|---|---|
| Ethylenically unsaturated monomers | | | |
| Methyl methacrylate | 170 | 34 | 136 |
| Ethyl acrylate | — | — | — |
| Butyl acrylate | 120 | 24 | 96 |
| 2-Ethylhexyl acrylate | — | — | — |
| Styrene | — | — | — |
| Acrylic acid | 8 | 1.6 | 6.4 |
| Methacrylic acid | — | — | — |
| Hydroxyethyl methacrylate | — | — | — |
| Acrylamide | 2 | — | 2 |
| Reactive emulsifier | 9 (3%) | 2.7 | 6.3 |

TABLE 7-continued (Example 7)

| Raw materials | Total amount (part) | Reactor | Addition |
|---|---|---|---|
| Aquaron HS-10 | | | |
| Polymerization initiators | | | |
| tert-Butyl benzoate | 3 | 0.5 | 2.5 |
| Sodium Erythorbate | 1 | 0.2 | 0.8 |
| Ion-exchanged water | 681 | 384.3 | 296.7 |

Aquaron HS-10 = reactive emulsifier (effective ingredient 98%) supplied by Daiichi Kogyo Seiyaku.

TABLE 8

(Example 8)

| Raw materials | Total amount (part) | Reactor | Addition |
|---|---|---|---|
| Ethylenically unsaturated monomers | | | |
| Methyl methacrylate | 170 | 34 | 136 |
| Ethyl acrylate | — | — | — |
| Butyl acrylate | 120 | 24 | 96 |
| 2-Ethylhexyl acrylate | — | — | — |
| Styrene | — | — | — |
| Acrylic acid | 8 | 1.6 | 6.4 |
| Methacrylic acid | — | — | — |
| Hydroxyethyl methacrylate | — | — | — |
| Acrylamide | 2 | — | 2 |
| Reactive emulsifier Aquaron HS-10 | 27 (9%) | 8.1 | 18.9 |
| Polymerization initiators | | | |
| tert-Butyl benzoate | 3 | 0.5 | 2.5 |
| Sodium Erythorbate | 1 | 0.2 | 0.8 |
| Ion-exchanged water | 681 | 384.3 | 296.7 |

Aquaron HS-10 = reactive emulsifier (effective ingredient 98%) supplied by Daiichi Kogyo Seiyaku.

TABLE 9

(Example 9)

| Raw materials | Total amount (part) | Reactor | Addition |
|---|---|---|---|
| Ethylenically unsaturated monomers | | | |
| Methyl methacrylate | 170 | 34 | 136 |
| Ethyl acrylate | — | — | — |
| Butyl acrylate | 120 | 24 | 96 |
| 2-Ethylhexyl acrylate | — | — | — |
| Styrene | — | — | — |
| Acrylic acid | 8 | 1.6 | 6.4 |
| Methacrylic acid | — | — | — |
| Hydroxyethyl methacrylate | — | — | — |
| Acrylamide | 2 | — | 2 |
| Reactive emulsifier Aquaron HS-10 | 15 (5%) | 4.5 | 10.5 |
| Polymerization initiators | | | |
| tert-Butyl benzoate | 3 | 0.5 | 2.5 |
| Sodium Erythorbate | 1 | 0.2 | 0.8 |
| Ion-exchanged water | 679 | 382.3 | 296.7 |
| Cupric sulfate (0.1 wt % aq.) | 2 | 2 | |

Aquaron HS-10 = reactive emulsifier (effective ingredient 98%) supplied by Daiichi Kogyo Seiyaku.

TABLE 10

(Example 10)

| Raw materials | Total amount (part) | Reactor | Addition |
|---|---|---|---|
| Ethylenically unsaturated monomers | | | |
| Methyl methacrylate | 170 | 34 | 136 |
| Ethyl acrylate | — | — | — |
| Butyl acrylate | 120 | 24 | 96 |
| 2-Ethylhexyl acrylate | — | — | — |
| Styrene | — | — | — |
| Acrylic acid | 8 | 1.6 | 6.4 |
| Methacrylic acid | — | — | — |
| Hydroxyethyl methacrylate | — | — | — |
| Acrylamide | 2 | — | 2 |
| Reactive emulsifier Aquaron HS-10 | 15 (5%) | 4.5 | 10.5 |
| Polymerization initiators | | | |
| tert-Butyl benzoate | 3 | 0.5 | 2.5 |
| Sodium Erythorbate | 1 | 0.2 | 0.8 |
| Ion-exchanged water | 679 | 382.3 | 296.7 |
| Ferric sulfate (0.1 wt % aq.) | 2 | 2 | |

Aquaron HS-10 = reactive emulsifier (effective ingredient 98%) supplied by Daiichi Kogyo Seiyaku.

COMPARATIVE EXAMPLES 1–5

Resin dispersions were prepared from raw materials shown in Tables 7 to 11 in the same manner as in Example except that a non-reactive emulsifier was used (Comparative Example 1), that the amount of the reactive emulsifier was too small (Comparative Example 2), that the amount of the reactive emulsifier was too large, that the amount of the reactive emulsifier preliminarily placed in the reactor was too small (Comparative Example 4) and that an inorganic polymerization initiator was used (Comparative Example 5).

TABLE 11

(Comparative Example 1)

| Raw materials | Total amount (part) | Reactor | Addition |
|---|---|---|---|
| Ethylenically unsaturated monomers | | | |
| Methyl methacrylate | 170 | 42.5 | 127.5 |
| Butyl acrylate | 120 | 30 | 90 |
| Acrylic acid | 10 | 2.5 | 7.5 |
| Reactive emulsifier Latemul S-180 | — | — | — |
| Non-reactive emulsifier Sannol NES | 50 (5%) | 20 | 30 |
| Polymerization initiators | | | |
| tert-Butyl benzoate | 3 | 0.5 | 2.5 |
| Sodium Erythorbate | 1 | 0.2 | 0.8 |
| Ammonium persulfate | — | — | — |
| Sodium biphosphite | — | — | — |
| Ion-exchanged water | 646 | 384.3 | 261.7 |

Sannol NES = anionic emulsifier (effective ingredient 30%) supplied by Lion Corp.

TABLE 12

(Comparative Example 2)

| Raw materials | Total amount (part) | Reactor | Addition |
|---|---|---|---|
| Ethylenically unsaturated monomers | | | |
| Methyl methacrylate | 170 | 42.5 | 127.5 |
| Butyl acrylate | 120 | 30 | 90 |
| Acrylic acid | 10 | 2.5 | 7.5 |
| Reactive emulsifier Latemul S-180 | 6 (1%) | 1.5 | 4.5 |
| Non-reactive emulsifier Sannol NES | — | — | — |
| Polymerization initiators | | | |
| tert-Butyl benzoate | 3 | 0.5 | 2.5 |
| Sodium Erythorbate | 1 | 0.2 | 0.8 |
| Ammonium persulfate | — | — | — |
| Sodium biphosphite | — | — | — |
| Ion-exchanged water | 690 | 384.3 | 305.7 |

TABLE 13

(Comparative Example 3)

| Raw materials | Total amount (part) | Reactor | Addition |
|---|---|---|---|
| Ethylenically unsaturated monomers | | | |
| Methyl methacrylate | 170 | 42.5 | 127.5 |
| Butyl acrylate | 120 | 30 | 90 |
| Acrylic acid | 10 | 2.5 | 7.5 |
| Reactive emulsifier Latemul S-180 | 72 (12%) | 36 | 36 |
| Non-reactive emulsifier Sannol NES | — | — | — |
| Polymerization initiators | | | |
| tert-Butyl benzoate | 3 | 0.5 | 2.5 |
| Sodium Erythorbate | 1 | 0.2 | 0.8 |
| Ammonium persulfate | — | — | — |
| Sodium biphosphite | — | — | — |
| Ion-exchanged water | 624 | 384.3 | 239.7 |

TABLE 14

(Comparative Example 4)

| Raw materials | Total amount (part) | Reactor | Addition |
|---|---|---|---|
| Ethylenically unsaturated monomers | | | |
| Methyl methacrylate | 170 | 42.5 | 127.5 |
| Butyl acrylate | 120 | 30 | 90 |
| Acrylic acid | 10 | 2.5 | 7.5 |
| Reactive emulsifier Latemul S-180 | 30 (5%) | 1.8 | 28.2 |
| Non-reactive emulsifier Sannol NES | — | — | — |
| Polymerization initiators | | | |
| tert-Butyl benzoate | 3 | 0.5 | 2.5 |
| Sodium Erythorbate | 1 | 0.2 | 0.8 |
| Ammonium persulfate | — | — | — |
| Sodium biphosphite | — | — | — |
| Ion-exchanged water | 666 | 384.3 | 281.7 |

TABLE 15

(Comparative Example 5)

| Raw materials | Total amount (part) | Reactor | Addition |
|---|---|---|---|
| Ethylenically unsaturated monomers | | | |
| Methyl methacrylate | 170 | 42.5 | 127.5 |
| Butyl acrylate | 120 | 30 | 90 |
| Acrylic acid | 10 | 2.5 | 7.5 |
| Reactive emulsifier Latemul S-180 | 30 (5%) | 12 | 18 |
| Non-reactive emulsifier Sannol NES | — | — | — |
| Polymerization initiators | | | |
| tert-Butyl benzoate | — | — | — |
| Sodium Erythorbate | — | — | — |
| Ammonium persulfate | 3 | 0.5 | 2.5 |
| Sodium biphosphite | 1 | 0.2 | 0.8 |
| Ion-exchanged water | 690 | 384.3 | 281.7 |

Coating compositions were prepared from the water-base resin dispersions obtained in Examples 1 to 6 and Comparative Examples 1 to 5, and coatings were formed from the coating compositions and measured for water resistance.

Test Methods

1. Preparation of coating composition:

A mixture of the following components was stirred with a sand mill for 30 minutes and defoamed under reduced pressure.

| Components for coating composition: | |
|---|---|
| (1) Water-base resin dispersion | 170 parts |
| (2) Titanium oxide (Tipaque R-930, supplied by Ishihara Sangyo K.K.) | 45 parts |
| (3) Dispersant 909 (Emalgen 909, supplied by Kao Corp.) | 1 part |
| (4) Ethylene glycol | 5 parts |
| (5) Thickener (Primal ASE60, supplied by Nippon Acryl Co., Ltd.) | 1 part |
| (6) Butyl carbitol | 5 parts |
| (7) Ammonia water | 0.2–0.5 part |
| (8) Water | 12.5–12.8 parts |

2. Formation of coating

A coating composition obtained in the above manner was applied to a glass plate with a brush to form a coating having a thickness of 0.5 mm, and the coating was allowed to stand at room temperature for 7 days.

3. The above-coated glass plate was immersed in water having a temperature of 40° C. for 30 minutes, and then taken out. Water was removed from the plate with gauze, and a whitening degree of the plate was visually determined on the basis of the following ratings.

Ratings:

5=Excellent (not at all whitened)

1=Poor (Extraordinarily whitened all over the surface)

4. Polymerization stability

Each of the water-base resins obtained in Examples and Comparative Examples was, separately from other, filtered through a 120-mesh metallic mesh filter, and the filtration residue (aggregates) was measured for a weight. The polymerization stability was evaluated as follows on the basis of the amount of the aggregates per kg of the water-base resin dispersion.

Ratings:
A: The amount of aggregates is 0 to 0.3 g/kg.
B: The amount of aggregates is more than 0.3 g/kg.

5. Resistance to whitening in hot water

The glass plate prepared in the above 2 was immersed in water at 70° C. for 30 minutes. Then, the glass plate was taken out of the water and cleaned of water with gauze, and the degree of whitening was visually evaluated.

Ratings:
5: Excellent (not at all whitened)
1: Poor (extraordinarily whitened all over the surface)

6. Alkali resistance

The glass plate prepared in the above 2 was immersed in a 5 wt % sodium hydroxide aqueous solution at 25° C. for 5 days, and then taken out of the solution. The degree of swelling of the coating was visually evaluated.

Ratings:
5. Excellent (not at all swollen)
1: Poor (extraordinarily swollen all over the surface)

Table 16 shows the degree of polymerization stability and average particle diameters of the resin dispersions obtained in Examples 1 to 10 and Comparative Examples 1 to 5 and the results of the water resistance test on the coating compositions prepared from the resin dispersions obtained in Examples 1 to 6 and Comparative Examples 1 to 5.

the radical-polymerizable ethylenically unsaturated monomer is at least one monomer selected from the group consisting of alkyl acrylates, alkyl methacrylates, styrene-containing monomers, vinyl carboxylates, acrylonitrile and methacrylonitrile, and the reactive emulsifier is at least one emulsifier selected from the group consisting of sulfosuccinic acid ester emulsifiers of the following formulae (1) or (2) and alkylphenol ether type emulsifiers of the following formula (3),

(1)

wherein $R^1$ is an alkyl group having 12 to 30 carbon atoms, and $M^1$ is Na, $NH_4$ or K,

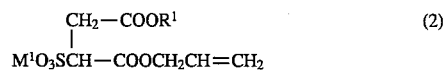
(2)

wherein $R^1$ and $M^1$ are as defined in the formula (1)

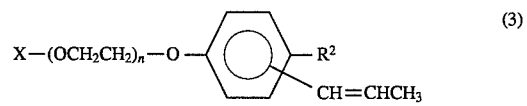
(3)

wherein $R^2$ is an alkyl group having 8 to 12 carbon atoms, X is H or $SO_3M_2$ in which $M_2$ is Na, $NH_4$ or K, and n is a number of from 50 to 120.

TABLE 16

|  | Examples | | | | | | | | | | Comparative Examples | | | | |
| --- | --- | --- | --- | --- | --- | --- | --- | --- | --- | --- | --- | --- | --- | --- | --- |
|  | 1 | 2 | 3 | 4 | 5 | 6 | 7 | 8 | 9 | 10 | 1 | 2 | 3 | 4 | 5 |
| Polymerization stability | A | A | A | A | A | A | A | A | A | A | A | B | A | A | A |
| Average particle diameter (nm) | 53 | 47 | 42 | 55 | 65 | 52 | 58 | 40 | 34 | 35 | 63 | 150 | 51 | 130 | 210 |
| Water resistance (whitening) | 5 | 5 | 5 | 5 | 5 | 5 | 5 | 5 | 5 | 5 | 1 | 2 | 1 | 2 | 2 |
| Resistance to whitening in hot water | 4 | 4 | 4 | 4 | 4 | 4 | 4 | 4 | 5 | 5 | 1 | 1 | 1 | 2 | 1 |
| Alkali resistance | 4 | 4 | 4 | 5 | 4 | 4 | 5 | 5 | 5 | 5 | 1 | 2 | 1 | 2 | 1 |

What is claimed is:

1. A process for producing a water-base resin dispersion having an average resin particle diameter of 25 to 100 nm by emulsion polymerization of a radical-polymerizable ethylenically unsaturated monomer in the presence of a reactive emulsifier in an amount of 2 to 10 parts by weight per 100 parts by weight of the radical-polymerizable ethylenically unsaturated monomer, the process comprising dropwise adding a mixture containing 30 to 100% by weight the total weight of said radical-polymerizable ethylenically unsaturated monomer, 20 to 90% by weight of the total weight of said reactive emulsifier and water to a reactor containing a transition metal in an amount of $10^{-7}$ to $10^{-5}$ moles per liter of the water placed in the reactor, 0 to 70% by weight of said radical-polymerizable ethylenically unsaturated monomer and 10 to 80% by weight of said reactive emulsifier and radical-polymerizing the radical-polymerizable ethylenically unsaturated monomer in the presence of an organic polymerization initiator, wherein:

2. A process according to claim 1, wherein the radical-polymerizable ethylenically unsaturated monomer further contains 0.05 to 10% by weight, based on a total monomer amount, of a carboxylic acid-containing monomer.

3. A process according to claim 1, wherein the radical-polymerizable ethylenically unsaturated monomer further contains 0.05 to 30% by weight, based on a total monomer amount, of at least one monomer selected from the group consisting of acrylamide, methacrylamide, N-methylolacrylamide, hydroxyethyl acrylate, hydroxypropyl methacrylate, hydroxypropyl acrylate, hydroxymethacrylate, hydroxyethyl methacrylate, glycidyl methacrylate, glycidyl acrylate, ethylene glycol dimethacrylate, divinylbenzene, vinyl triethoxysilane, γ-methacryloxypropyltriethoxysilane and ethyl silicate.

4. A process according to claim 1, wherein the reactive emulsifier is an emulsifier having at least one radical-polymerizable unsaturated group.

5. A process according to claim 1, wherein the organic polymerization initiator is used in an amount of 0.5 to 10 parts by weight per 100 parts by weight of the ethylenically unsaturated monomer.

6. The process according to claim 1, wherein 10 to 50% by weight of the organic polymerization initiator is preliminarily placed in the reactor together with part of the ethylenically unsaturated monomer and part of the reactive emulsifier.

7. A process according to claim 1, wherein the mixture is added as an emulsion composed of 100 parts by weight of the ethylenically unsaturated monomer, 50 to 200 parts by weight of water and a balance of the reactive emulsifier.

8. A process according to claim 1, wherein the water-base resin dispersion is produced as a dispersion having a solid content of 20 to 60% by weight.

* * * * *